(12) United States Patent
Aradachi et al.

(10) Patent No.: US 8,093,859 B2
(45) Date of Patent: Jan. 10, 2012

(54) CHARGING SYSTEM FOR CHARGING BATTERY PACK

(75) Inventors: Takao Aradachi, Hitachinaka (JP); Kazuhiko Funabashi, Hitachinaka (JP); Shigeru Takahashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 447 days.

(21) Appl. No.: 12/360,141

(22) Filed: Jan. 27, 2009

(65) Prior Publication Data

US 2009/0189562 A1 Jul. 30, 2009

(30) Foreign Application Priority Data

Jan. 28, 2008 (JP) ................ P2008-016958

(51) Int. Cl.
*H02J 7/00* (2006.01)
(52) U.S. Cl. ...................... 320/106; 320/134
(58) Field of Classification Search .............. 320/106, 320/112, 134
See application file for complete search history.

(56) References Cited

U.S. PATENT DOCUMENTS

2006/0028178 A1* 2/2006 Hobbs ........................ 320/128
2008/0211460 A1* 9/2008 Tarng et al. ................. 320/161

FOREIGN PATENT DOCUMENTS

JP 02-192670 7/1990

* cited by examiner

*Primary Examiner* — Bot Ledynh
(74) *Attorney, Agent, or Firm* — Antonelli, Terry, Stout & Kraus, LLP.

(57) ABSTRACT

A charging system has a battery pack and a charging device. The battery pack has a battery cell and a plurality of identifiers that identify a configuration of the battery cell. The charging device has a charging unit, a signal transmission unit, a reading unit, and a control unit. The charging unit charges the battery pack. The signal transmission unit transmits a first signal and a second signal to the battery pack separately to read the plurality of identifiers when the battery pack is attached to the charging unit. The reading unit reads the plurality of identifiers according to the first and second signals to determine the configuration of the battery cell. The control unit controls the charging unit according to the configuration of the battery cell.

4 Claims, 4 Drawing Sheets

CHARGING SYSTEM FOR CHARGING BATTERY PACK

CROSS REFERENCE TO RELATED APPLICATIONS

This application claims priority from Japanese Patent Application No. 2008-016958 filed Jan. 28, 2008. The entire content of the priority application is incorporated herein by reference.

TECHNICAL FIELD

The present invention relates to a battery pack comprising a secondary battery such as a lithium ion secondary battery, a charging device for charging the battery pack, and a charging system including the charging device for charging the battery pack.

BACKGROUND

In general, a cordless electric tool uses a secondary battery pack that is rechargeable with a charging device as a power supply. A lithium ion (Li-ion) battery cell is commonly used to form the secondary battery pack. A charging device for a Li-ion type battery pack generally charges the battery pack with a constant charging current and at a constant charging voltage. In particular, in order to avoid reverse charging for each battery cell, the charging device charges the battery pack with the constant charging current until the battery voltage reaches a predetermined value, for example, 4.2 V/cell, and then charges at the constant charging voltage until the current passing through the battery pack reduces under a predetermined value due to full charging.

There are two types of battery pack to be charged by the charging device: a first type of battery pack and a second type of battery pack. The first type of battery pack is a 4S1P type of battery pack having a nominal voltage of 14.4 V, in which four battery cells are connected in series. The second type of battery pack is a 4S2P type of battery pack having a nominal voltage of 14.4 V, in which a pair of battery cells is connected in parallel and four pairs of parallel-connected battery cells are connected in series. Each of the battery packs generally has an identifying resistor identifying the configuration of the battery cells in the battery pack.

If one charging device selectively charges the above two different types of battery packs and flows the same amount of charging current through each battery pack, the amount of current passing through each cell of the 4S1P type is twice as much as the amount of current passing through each cell of the 4S2P type. This phenomenon may result in shortening the lifespan of the 4S1P type, compared with the lifespan of the 4S2P type.

The charging device has a unit for detecting the identifying resistor of the battery pack to determine the type thereof. When the first battery pack having a nominal voltage of 14.4 V (which includes four battery cells connected in series) has a resister having a resistance of a, and the second battery pack having a nominal voltage of 18 V (which includes five battery cells connected in series) includes a resister having a resistance of b, a microcomputer of the charging device detects the divided voltage of a reference voltage by the resistor of a or b and the internal resistor w of the charging device, and then determines which the first or second battery pack is connected with the charging device.

As described above, each battery pack has an identifying resistor having its own resistance. However, if the charging device erroneously determines the resistance of the identifying resistor, the charging device may feed an improper current flow to the battery pack, which may adversely affecting the lifetime of the battery pack.

An object of the invention is to provide a charging system in which a charging device suitably feeds a charging current to a battery pack, depending on the type of the battery pack.

SUMMARY

The present invention provides a battery pack having a battery cell, and one or more identifiers that identify a configuration of the battery cell.

The present invention further provides a charging device having a charging unit, a signal transmission unit, a reading unit, and a control unit. The charging unit charges a battery pack. The signal transmission unit transmits a first signal and a second signal to the battery pack separately to read a plurality of identifiers included in the battery pack when the battery pack is attached to the charging unit. The reading unit reads the plurality of identifiers of the battery pack according to the first and second signals to determine the configuration of the battery cell included in the battery pack. The control unit controls the charging unit according to the configuration of the battery cell.

Further, the present invention is applicable to a charging system including the battery pack and the charging device according to the present invention. In this case, the charging system exhibits the similar advantages to those of the battery pack and the charging device of the present invention.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
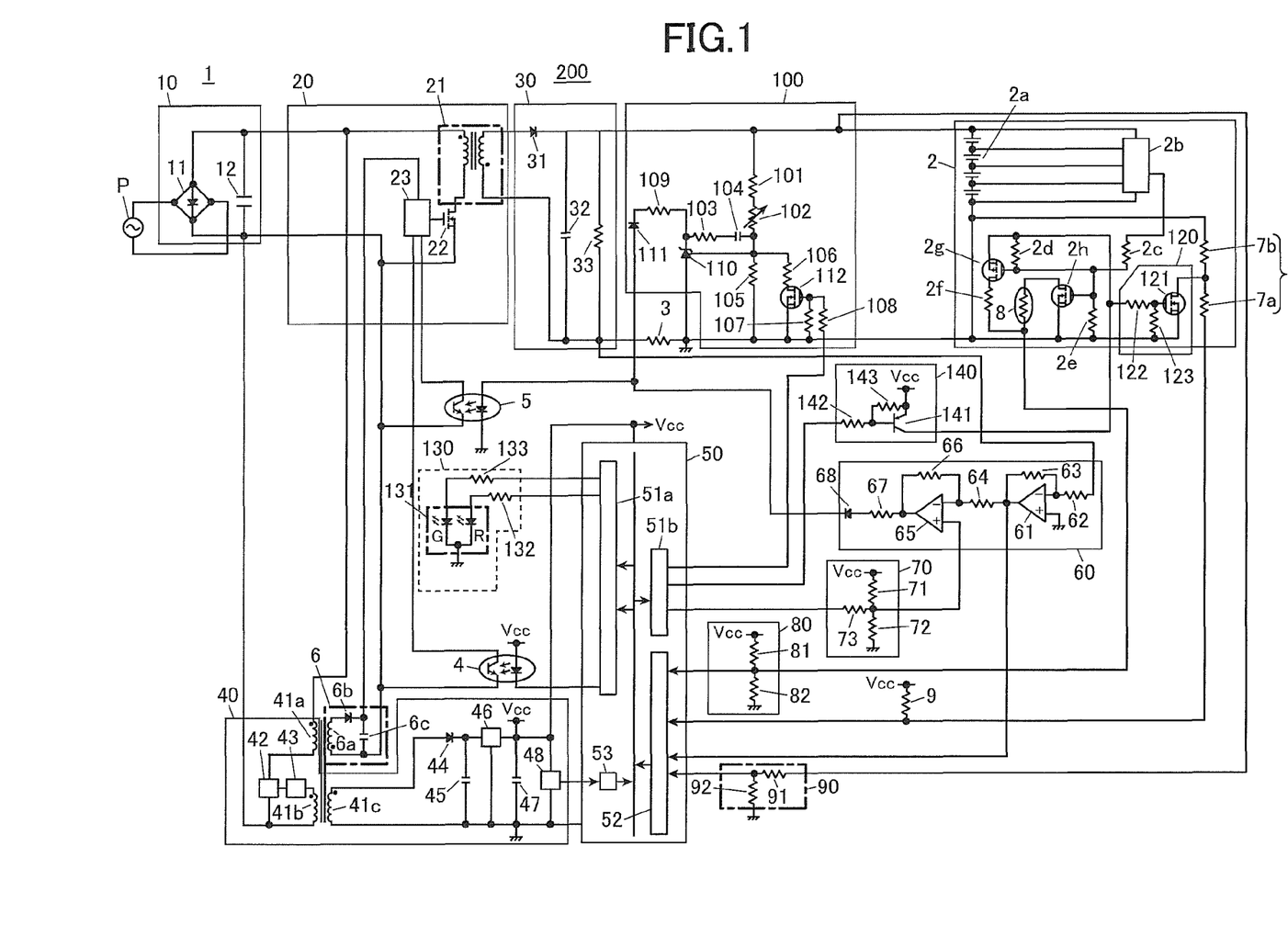
FIG. 1 is a circuit diagram of a charging device according to the present invention.
Figure 2:
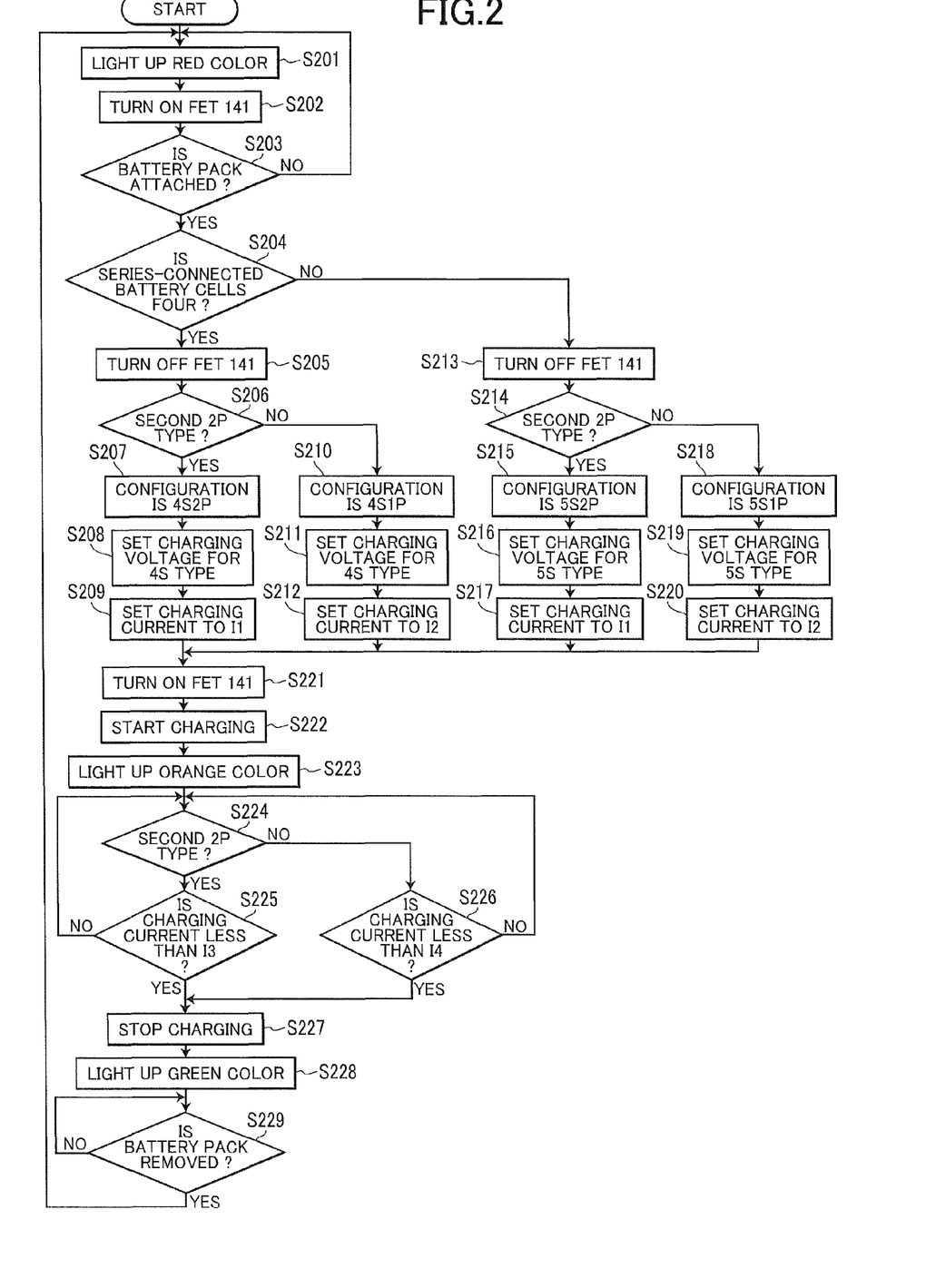
FIG. 2 shows a flowchart illustrating a process for charging a battery pack with the charging device shown in FIG. 1.

The next description will explain a charging system 200 according to an embodiment of the present invention, referring to FIGS. 1 and 2. FIG. 1 shows a circuit diagram of the charging system 200 including a charging device 1 for charging a battery pack 2 with power supplied from an alternating-current power supply P.

The charging device 1 charges any one of different types of battery packs 2. In this embodiment, the battery packs 2 includes a first type of battery pack 2 and a second type of battery pack 2, which has a different configuration of battery cells 2a. The configuration of battery cells 2a means the number of series-connected battery cells and a connection manner of the battery cells in the battery pack: series-connection or parallel-connection, how many cells are connected in series, and how many cells are connected in parallel. Each of the first and second types of battery cells 2a includes a single battery cell 2a or a plurality of battery cells 2a and has a positive terminal and a negative terminal. The battery cells 2a is made from a lithium ion (Li-ion) secondary cell. The battery pack 2 further includes a protection IC 2b that monitors a charging voltage applied across each battery cell 2a and produces a signal on detecting over-charge or over-discharge of the battery cell 2a.

The first type of battery pack includes a single battery cell 2a or a plurality of battery cells 2a connected in series, so called, a 1P type of battery pack. One example is a 4S1P battery pack having a nominal voltage of 14.4V. The 4S1P battery pack includes four battery cells 2a connected in series.

The second type of battery pack includes a single battery unit or a plurality of battery units connected in F series, each battery unit including two battery cells 2a connected in parallel. The second type of battery pack is so called a 2P type of battery pack. One example is a 4S2P battery pack having has a nominal voltage of 14.4 V and having eight battery cells 2a, in which two battery cells 2a are connected in parallel to form one battery unit and four battery unit are connected in series. The second type of battery pack 2 may have more than two battery cells 2a connected in parallel in each battery unit. As described above, the second type of battery pack includes a plural-P type of battery pack (plural being an integer more than 1). For example, a 4S3P battery pack has twelve battery cells 2a in which three battery cells 2a are connected in parallel to form one battery unit and four battery units are connected in series.

The battery pack 2 further includes a battery type identifier 7, a thermosensor 8, and a switching portion 120. The battery type identifier 7 represents a configuration of the battery cells 2a in the battery pack 2. In particular, the battery type identifier 7 represents the number of battery cells 2a and their connecting configuration such as series-connection and/or parallel connection in the battery pack 2. The battery type identifier 7 includes a first battery identifying resistor 7a and a second battery identifying resistor 7b connected in series. The first battery identifying resistor 7a identifies the number of battery cells 2a connected in series and is used for the charging device 1 to determine how many battery cells 2a are connected in series in the battery pack 2. The second battery identifying resistor 7b identifies the configuration of battery cells 2a. And the second battery identifying resistor 7b is used to determine the configuration of the battery cells 2a, simple series connection or parallel connection, when the second resister 7b is operationally connected with the first resister 7a in series. Specifically, the second battery identifying resistor 7b identifies the configuration of the battery pack 2 such as simple series-connection or parallel-connection. In this embodiment, the simple series connection means a plurality of battery cells 2a connected in series without including any parallel connection of battery cells 2a.

The thermosensor 8 is a thermistor provided close to or on the battery cell 2a to detect a temperature in the battery pack 2. Resistors 2c, 2d, 2e, 2f, and FETs 2g, 2h are provided around to be associated with the thermosensor 8.

The switching portion 120 includes a FET 121 and resistors 122 and 123, and is connected to a node between the first and second battery identifying resistors 7a and 7b. The FET 121 is controlled by a control signal supplied from the charging device 1. During a normal operation, the switching portion 120 receives an input voltage Vcc from the charging device 1 and the protection IC 2b does not generate any signal, so that the input voltage Vcc is applied to gates of the FETs 2g and 2h to turn on the FET 2h.

On the other hand, if over-discharge from the battery cell 2a happens, the protection IC 2b generates a LOW signal to turn off the FET 2h and turn on the FET 2f. Accordingly, the battery pack 2 outputs the voltage Vcc to the charging device 1 instead of the voltage related to the temperature of the battery pack 2 and informs the charging device 1 that the over-discharge of the battery cell 2a occurs.

The charging device 1 is provided with a current detection unit 3, a charging control signal transmission unit 4, a charging current signal transmission unit 5, a rectification smoothing circuit 6, a battery type determination resistor 9, a rectification smoothing circuit 10, a switching circuit 20, a rectification smoothing circuit 30, a power supply 40, a microcomputer 50, a charging current control circuit 60, a charging current setting unit 70, a battery temperature detection unit 80, a battery voltage detection unit 90, a charging voltage control unit 100, a display unit 130, and a switching unit 140.

The current detection unit 3 is a resistor, and detects a voltage applied across the resistor in order to obtain a charging current flowing through the battery pack 2.

The rectification smoothing circuit 10 includes a full-wave rectifier circuit 11 and a smoothing capacitor 12. The full-wave rectifier circuit 11 rectifies the alternating-current supplied from the alternating-current power supply P, and the smoothing capacitor 12 smoothes the direct-current outputted from the full-wave rectifier circuit 11.

The switching circuit 20 includes a high-frequency transformer 21 having a primary winding and a secondary winding, a MOSFET (switching element) 22 connected with the primary winding in series, and a PWM control IC (switching control IC) 23.

A driving power for the PWM control IC 23 is supplied from the rectification smoothing circuit (direct current power source) 6. The rectification smoothing circuit 6 includes a transformer 6a, a rectifier diode 6b, and a smoothing capacitor 6c, and passes the power from the power supply 40 to the PWM control IC 23. The PWM control IC 23 receives a charging voltage control signal and a charging current control signal through the charging current signal transmission unit 5, which is a photocoupler, from the charging current control circuit 60. The PWM control IC 23 receives a start signal and a stop signal for controlling start and stop of charging the battery pack 2 through the charging control signal transmission unit 4, which is a photocoupler, from the microcomputer 50. The PWM control IC 23 changes the drive pulse width applied to the gate of the MOSFET 22 in order to adjust an output voltage outputted to the rectification smoothing circuit 30 and a charging current passing through the battery pack 2.

The rectification smoothing circuit 30 includes a diode 31 connected with the secondary winding of the transformer 21, a smoothing capacitor 32, and a discharging resistor 33. The diode 31 rectifies the alternating-current supplied from the switching circuit 20, and the smoothing capacitor 32 smoothes the direct-current outputted from the diode 31.

The determination resistor 9 divides a reference voltage (stabilized direct voltage) Vcc together with the identifier 7. The divided voltage is outputted as cell configuration information indicating the number of the battery cells 2a and their configuration in the battery pack 2.

The power supply 40 includes transformers 41a to 41c, a switching element 42, a control element 43, a rectifier diode 44, a three-terminal regulator 46, a smoothing capacitor 45 connected to an input terminal of the regulator 46, a smoothing capacitor 47 connected to an output terminal of the regulator 46, and the reset IC 48, and supplies power to the microcomputer 50 and the rectification smoothing circuit 6. The reset IC 48 outputs a reset signal to the microcomputer 50 through the reset port 53 when the commercial power source P supplies power to the charging device 1.

The microcomputer 50 includes output ports 51a and 51b, an A/D input port 52, and the reset port 53. The microcomputer 50 further includes a central processing unit (CPU), a read-only-memory (ROM) for storing control programs for the CPU and data associated with the types of battery packs 2, a random-access memory (RAM) used for a working area for the CPU and a temporary storage area for the data, and a timer. The cell configuration information outputted from the determination resistor 9, the battery temperature information outputted from the battery temperature detection unit 80, the battery voltage information outputted from the battery voltage detection unit 90, and the voltage detected by the current detection unit 3 are inputted into the A/D port 52. Accordingly, the microcomputer 50 determines the battery temperature and the battery voltage. The microcomputer 50 generates control signals to the power supply 40 and the charging current control circuit 60, and outputs control signals to the charging control signal transmission unit 4 and the display unit 130, and a charging state signal from the output port 51a.

the microcomputer 50 determinates the configuration and the number of the series-connected cells of the battery pack 2 based on the cell configuration information, and outputs a charging voltage control signal corresponding to the number of the series-connected cells from the output port 51b to the charging voltage control unit 100. The microcomputer 50 outputs a charging current control signal based on the cell configuration information to the charging current setting unit 70. The microcomputer 50 outputs a control signal to turn on/off a FET 141 in the switching unit 140. The reset port 53 receives a reset signal from the reset IC 48.

The charging current control circuit 60 includes an operational amplifier circuit having operational amplifiers (op-amps) 61 and 65, input resistors 62 and 64 and feedback resistors 63 and 66 for the op-amps 61 and 65, a diode 68, and current limiting resistor 67. An inverting terminal of the op-amp 61 is connected to the current detection unit 3. A non-inverting terminal of the op-amp 65 is connected to the charging current setting unit 70. An output terminal of the charging current control circuit 60 is connected to the PWM control IC 23 through the charging current signal transmission unit 5. The charging current control circuit 60 outputs the current control signal based on both the charging current (the voltage) detected by the current detection unit 3 and the reference value outputted from the charging current setting unit 70. An output terminal of the op-amp 61 is connected to the A/D converter 52 in order to monitor the charging current, so that the microcomputer 50 determines a reduction of the charging current when the battery pack 2 is fully charged.

The charging current setting unit 70 sets an amount of charging current passing through the battery pack 2, depending on the type of the battery pack 2. The charging current setting unit 70 includes resistors 71 and 72 connected in series between the reference voltage Vcc and a ground. The charging current setting unit 70 further includes a resistor 73 which may be connected with the resistor 72 in parallel. The reference voltage Vcc is divided by the resistors 71 and 72, and the divided voltage is outputted as a reference value for setting the charging current. The resistor 73 is connected with the with the resistor 72 in parallel, depending on the type of the battery pack 2, so that the charging current setting unit 7 changes the amount of charging current.

For example, if the microcomputer 50 generates no signal to control that only the resistor 72 is selected as being connected with the resistor 71 in series, the microcomputer 50 sets a first charging current $I_1$ passing through the battery pack 2. If the microcomputer 50 generates a LOW signal to control that the resistor 73 is selected as being connected to the resistor 72 in parallel and the resistor 71 is connected with the parallel-connected resistors 72 and 73, the microcomputer 50 sets a second charging current $I_2$ passing through the battery pack 2. In this case, the microcomputer 50 sets the amount of the first charging current more than the amount of the second charging current.

In the charging current control circuit 60, the resistors 62 and 63 and the op-amp 61 invert and amplify the voltage across the current detection unit 3. The op-amp 65 amplifies the difference between the output of the op-amp 61 and the setting voltage corresponding to the charging current value set by charging current setting unit 70. The output of the charging current control circuit 60 is supplied to the PWM control IC 23 through the charging current signal transmission unit 5 to control the switching operation of the MOSFET 22. In other words, the current detection unit 3, the charging current control circuit 60, the charging current signal transmission unit 5, the switching circuit 20, and the rectification smoothing circuit 30 adjust the actual charging current passing through the battery pack 2 to the charging current set by the charging current setting unit 70.

The battery temperature detection unit 80 includes resistors 81 and 82 connected in series between the reference voltage Vcc and the ground (voltage divider circuit). The reference voltage Vcc is divided by the resistor 81 and the combined resistance of the thermosensor 8 and the resistor 82 when the FET 2h is turned on. The divided voltage representing a temperature change in the resistance of the thermosensor 8 is outputted as battery temperature information to an A/D convertor 52 of the microcomputer 50.

The battery voltage detection unit 90 includes resistors 91 and 92, and is connected with the positive terminal of the battery pack 2. The battery voltage is divided by the resistors 91 and 92, and the divided voltage is outputted as battery voltage information to the A/D convertor 52 of the microcomputer 50.

The charging voltage control unit 100 controls the charging voltage applied across the battery pack 2, and includes resistors 101, 105, 106, 107, 108, and 109, a potentiometer 102, a capacitor 104, a shunt regulator 110, a rectifying diode 111, and a FET 112. The charging voltage is determined in the manner that a divided voltage by the series resistance of the resistor 101 and the potentiometer 102, and the resistor(s) 105 and/or 106, the resistor 109 becomes equal to a reference voltage of the shunt regulator 110. For example, the charging voltage defined by the series resistance of the resistor 101 and the potentiometer 102, and the resistor 105 is used for charging the battery pack 2 having four battery cells connected in series. And, the charging voltage defined by the series resistance of the resistor 101 and the potentiometer 102, and the parallel resistance of the resistors 105 and 106 is used for charging the battery pack 2 having five battery cells connected in series. In the latter case, the FET 112 is turned on.

The display unit 130 indicates the charging state of the battery pack 2, and includes an LED 131, resistors 132 and 133. The LED 131 includes a green diode G and a red diode R. When the charging state signal outputted from the output port 51a is inputted into the red diode R via the resistor 132, the red diode R lights up with red color, and indicates that the battery pack 2 is prior to charging. When the charging state signal is inputted into the green diode G via the resistor 133, the green diode G lights up with green color, and indicates that charging battery pack 2 is completed. Furthermore, when the charging state signal are inputted into both the green diode G via the resistor 133 and the red diode R via the resistor 132 concurrently, the LED 131 lights up with orange color, and indicates that the battery pack 2 is in a process for charging. In this embodiment, the LED 131 lights up with the red color before charging, with the orange color during charging, and with the green color after charging.

The switching unit 140 includes the FET 141 and resisters 142, 143 to control the FET 121 in the battery pack 2. The FET 141 is controlled by a control signal from the microcomputer 50. When receiving a LOW signal from the microcomputer 50, the FET 141 is turned on so that the reference voltage Vcc is applied to the gate of the FET 121 in the battery pack 2. When the FET 121 is turned on, the reference voltage Vcc is divided by the determination resistor 9 and the first battery identifying resistor 7a so that the divided voltage is detected by the microcomputer 50. On the other hand, when the FET 121 is turned off, the reference voltage Vcc is divided by the determination resistor 9 and the series resistance of the first and second identifying resistors 7a, 7b so that the divided voltage is detected by the microcomputer 50.

A charge-control process for charging the battery pack 2 by the charging device 1 in the charging system 200 according to the present invention will be described, referring to FIG. 2.

In this embodiment, the charging device 1 has an ability to charge the first type of battery pack 2 such as 4S1P and 5S1P types, and the second type of battery pack 2 such as 4S2P and 5S2P types. The 4S1P type of battery pack 2 has four series-connected battery cells 2a, a first battery identifying resistor 7a of resistance "a", and a second battery identifying resistor 7b of resistance "c". The configuration is series connection. The 4S2P type of battery pack 2 has eight battery cells 2a and a first battery identifying resistor 7a of resistance "a". The 4S2P type has no second battery identifying resistor 7b. In the 4S2P type, two battery cells 2a are connected in parallel as a battery unit, and four battery units are connected in series to make the battery pack 2. Accordingly, the configuration is parallel connection.

The 5S1P type of battery pack 2 has five series-connected battery cells 2a, a first battery identifying resistor 7a of resistance "b", and a second battery identifying resistor 7b of resistance "d". The configuration is series connection. The 5S2P type of battery pack 2 has ten battery cells 2a and a first battery identifying resistor 7a of resistance "d". The 5S2P type has no second battery identifying resistor 7b. In the 4S2P type, two battery cells 2a are connected in parallel to provide a battery unit, and four battery units are connected in series to make the battery pack 2. Accordingly, the configuration is parallel connection. In the above case, the resistance a is smaller than the resistance b, and the sum of resistances (a+c) is equal to the sum of resistances (b+d).

In Step 201, the microcomputer 50 initializes the output ports 51a and 51b, when power is supplied. The display unit 130 then displays that the current condition is prior to charging. In this embodiment, the microcomputer 50 outputs a HIGH signal from the output port 51a through the resistor 133 to the display unit 130, so that the display unit 130 lights up with red color to display that the charging device 1 is prior to charging.

In Step 202, the microcomputer 50 outputs a LOW signal from the output port 51b through the resistor 142 to the switching unit 140 to turn on the FET 141, before the battery pack is attached to the charging device 1. Since the FET 141 is on, the reference voltage Vcc is ready for applying the battery pack 2.

In Step 203, the microcomputer 50 determines whether or not the battery pack 2 has been attached to the charging device 1. If the microcomputer 50 detects a change in the voltage appearing at the A/D port 52 receiving an output signal from the battery temperature detection unit 80, the microcomputer 50 determines that the battery pack has been attached to the charging device 1.

In Step 204, the microcomputer 50 determines at the time to how many battery cells 2a are connected in series in the battery pack 2, based on the voltage inputted to the A/D port 52 from the determination resistor 9. In this case, because the FET 141 is on, the reference voltage Vcc is applied to the gate terminal of the FET 121 in the battery pack 2 to turn on the FET 121. Therefore, the reference voltage Vcc is applied across the series-connected the first battery identifying resistor 7a and the determination resistor 9.

Figure 3A:
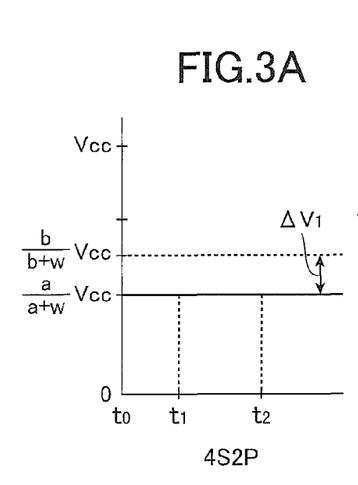
FIGS. 3A to 3D show divided voltages inputted to microcomputer, depending on configuration of battery pack, to determine the configuration of battery pack.
Figure 3B:
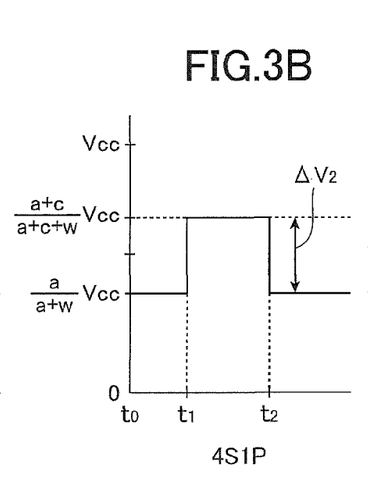
Figure 3C:
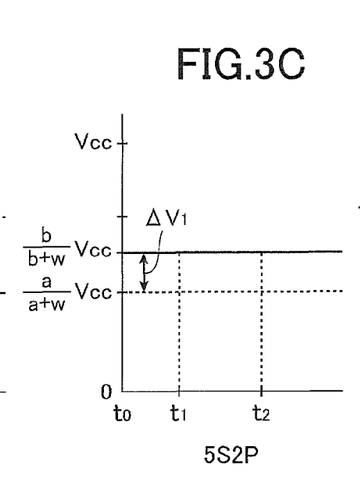
Figure 3D:
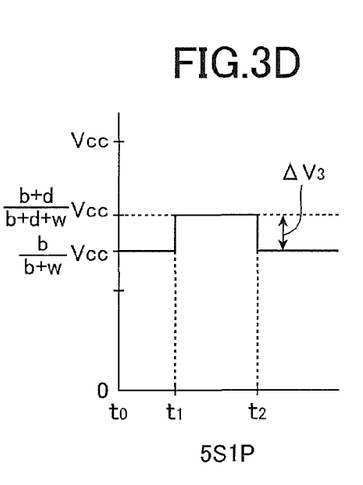

The voltage obtained by dividing the voltage Vcc based on the ratio between the resistances of the determination resistor 9 and the first battery identifying resistor 7a is inputted to the A/D port 52 of the microcomputer 50. For example, provided that the determination resistor 9 has a resistance of w. If the battery pack 2 has four cells connected in series, the voltage of Vcc×a/(a+w) is inputted to the A/D port 52, as shown in FIG. 3A or 3B. If the battery pack has five cells connected in series, the voltage of Vcc×b/(b+w) is inputted to the A/D port 52, as shown in FIGS. 3C and 3D. Thus, the voltage inputted to the A/D port 52 is changed according to the number of battery cells 2a connected in series, so that the microcomputer 50 determines based on the potential difference $\Delta V_1$ at the A/D port 52 whether or not the battery pack 2 attached in the charging device 1 has four battery cells 2a connected in series.

If the microcomputer 50 has determined that the battery pack 2 has four battery cells 2a connected in series in Step 204 (FIGS. 3A and 3B), the process goes to Step 205, in which the microcomputer 50 turns off the FET 141 at the time $t_1$. The microcomputer 50 turns off the FET 141 by outputting a HIGH signal from the output port 51b of the microcomputer 50 through the resistor 142 to the switching unit 140. In Step 206, the microcomputer 50 determines the type of battery pack 2, the first type 1P or the second type 2P. How the microcomputer 50 determines the type of battery pack in Step 206 will be described as follows.

Since the FET 141 is turned off in Step 205, the FET 121 is also turned off at the time $t_1$. When the FET 121 is turned off, the second battery identifying resistor 7b is operationally connected with the first battery identifying resistor 7a in series, if the battery pack 2 includes the second battery identifying resistor 7b. Therefore, if the battery pack 2 has the second battery identifying resistor 7b, the voltage obtained by dividing the voltage Vcc changes based on the ratio between the resistance of the determination resistor 9 and the series-connected resistances of the battery identifying resistors 7a and 7b and is inputted to the A/D port 52 of the microcomputer 50, as shown in FIG. 3B. In this embodiment, if the battery pack 2 is the first type 4S1P, the divided voltage is changed from Vcc×a/(a+w) to Vcc×(a+c)/((a+c)+w) due to the second battery identifying resistor 7b and inputted to the A/D port 52, as shown in FIG. 3B. If the battery pack 2 is the second type, the voltage: Vcc×a/(a+w) inputted to the A/D port 52 is not changed, as shown in FIG. 3A. This is because the second type 4S2P has no second battery identifying resistor 7b. The microcomputer 50 determines based on the potential difference $\Delta V_2$ at the A/D port 52 whether the battery pack 2 is the first type or the second type.

If the microcomputer 50 has determined that the battery pack 2 is the second type (Yes in Step 206), the microcomputer 50 determines that the battery pack 2 is a 4S2P type in Step 207. In Step 208, the microcomputer 50 sets a charging voltage for charging the 4S2P type of battery pack 2, and then turns off the FET 112 to set the charging voltage for the 4S2P type. For example, the voltage of 16.8V is employed as the charging voltage for charging the 4S2P type of battery pack 2. In Step 209, the microcomputer 50 sets a charging current to I1. In order to set the charging current to I1, the microcomputer 50 outputs no signal from the output port 51*b* so that the resistor 73 is not operationally and electrically connected to the series-connected resistors 71 and 72. Accordingly, the charging current I1 is set to 7.5 A, for example.

If the microcomputer 50 has determined that the battery pack 2 is not the second type in Step 206, the microcomputer 50 determines in Step 210 that the battery pack 2 is the 4S1P type. In Step 211, the microcomputer 50 sets a charging voltage for the 4S1P type of battery pack 2. The microcomputer 50 turns off the FET 112 to set the charging voltage for the 4S1P type. For example, the voltage of 16.8V is employed as the charging voltage for charging the 4S1P type. In Step 212, the microcomputer 50 sets a charging current to the current I2 (I2<I1). In order to set the charging current to I2, the microcomputer 50 outputs a LOW signal from the output port 51*b* to operationally connect the resistor 73 in parallel with the resistor 72. Accordingly, the charging current 3.75 A is employed as the current value I2, for example.

On the other hand, if the microcomputer 50 has determined that four battery cells 2*a* are not connected in series in the battery pack 2 in Step 204, in other words, if the microcomputer 50 has determined that the battery pack 2 has five battery cells 2*a* connected in series, which is the 5S type. The microcomputer 50 turns off the FET 141 at the time $t_1$ in Step 213. In order to turn off the FET 141, the microcomputer 50 outputs a HIGH signal from the output port 51*b* through the resistor 142 to the switching unit 140.

In Step 214, the microcomputer 50 determines whether or not the battery pack 2 is a 5S2P type. How the microcomputer 50 determines the type of the battery pack 2 in Step 214 will be given below.

Since the FET 141 is turned off in Step 213, the FET 121 is also turned off at the time $t_1$. When the FET 121 is turned off, the second battery identifying resistor 7*b* is operationally connected with the first battery identifying resistor 7*a* in series, if the battery pack 2 includes the second battery identifying resistor 7*b*. Therefore, if the battery pack 2 has the second battery identifying resistor 7*b*, the voltage obtained by dividing the voltage Vcc changes based on the ratio between the resistance of the determination resistor 9 and the series-connected resistances of the battery identifying resistors 7*a* and 7*b* and is inputted to the A/D port 52 of the microcomputer 50, as shown in FIG. 3D. In this embodiment, if the battery pack 2 is the first 5S1P type, the divided voltage is changed from Vcc×b/(b+w) to Vcc×(b+d)/((b+d)+w) due to the second battery identifying resistor 7*b* and is inputted to the A/D port 52, as shown in FIG. 3D. If the battery pack 2 is the second type, the voltage: Vcc×b/(b+w) inputted to the A/D port 52 is not changed, as shown in FIG. 3C. This is because the second type 5S2P has no second battery identifying resistor 7*b*. The microcomputer 50 determines based on the potential difference $\Delta V_3$ at the A/D port 52 whether the battery pack 2 is the first type or the second type.

If the microcomputer 50 has determined that the battery pack 2 is the second type (Yes in Step 214), the microcomputer 50 determines that the battery pack 2 is a 5S2P type in Step 215. In Step 216, the microcomputer 50 sets a charging voltage for charging the 5S2P type of battery pack 2, and then turns on the FET 112 to set the charging voltage for the 5S2P type. For example, the voltage of 21V is employed as the charging voltage for charging the second type of battery pack 2. In Step 217, the microcomputer 50 sets a charging current to I1. In order to set the charging current to I1, the microcomputer 50 outputs no signal from the output port 51*b* so that the resistor 73 is not operationally connected to the series-connected resistors 71 and 72. Accordingly, the charging current I1 is set to 7.5 A, for example.

If the microcomputer 50 has determined that the battery pack 2 is not the second type in Step 214, the microcomputer 50 determines in Step 218 that the battery pack 2 is a 5S1P type. In Step 219, the microcomputer 50 sets a charging voltage for the 5S1P type of battery pack 2. The microcomputer 50 turns on the FET 112 to set the charging voltage for the 5S1P type. For example, the voltage of 21V is employed as the charging voltage for charging the 5S1P type. In Step 220, the microcomputer 50 sets a charging current to the current I2 (I2<I1). In order to set the charging current to I2, the microcomputer 50 outputs a LOW signal from the output port 51*b* to operationally and electrically connect the resistor 73 in parallel with the resistor 72. Accordingly, the charging current 3.75 A is employed as the current value I2, for example.

After the microcomputer 50 sets the charging voltage and the charging current as described above, in Step 221, the microcomputer 50 outputs a LOW signal from the output port 51*b* through the resistor 142 to the switching unit 140 to turn on the FET 141 at the time $t_2$ again.

In Step 222, the microcomputer 50 outputs a LOW signal from the output port 51*a* to the PWM control IC 23 through the charging control signal transmission unit 4 to start charging the battery pack 2. In Step 223, while the charging device 1 is charging the battery pack 2, the LEC 131 in the display unit 130 lights up with orange color and indicates that the battery pack 2 is in a process for charging. In other words, the microcomputer 50 outputs a HIGH signal from the output port 51*a* through the resistors 132 and 133 to the display unit 130, so that the display unit 130 lights up with orange color to display the charging state.

In Step 224, while the charging device 1 is charging the battery pack 2, the microcomputer 50 determines whether or not the battery pack 2 is the second type. The type of the battery pack 2 has been determined in Step 206 or Step 214. If the microcomputer 50 has determined that the battery pack 2 is the second type, the microcomputer 50 determines whether or not the actual charging current is equal to or smaller than I3 (I3<I1) in Step 225. For example, it is assumed that the current of 3 A is employed as the current value I3. In this embodiment, the charging device 1 charges the battery pack 2 under constant current and constant voltage charging control. When the charging voltage reaches a predetermined value, the microcomputer 50 starts decreasing the charging current. After that, when the charging current reaches another predetermined value which is smaller than the predetermined value, the microcomputer 50 determines that the battery pack 2 has been fully charged. If the microcomputer 50 has determined that the charging current is equal to or smaller than I3 in Step 225, the microcomputer 50 determines that the battery pack 2 has been fully charged. In order to stop charging, the microcomputer 50 outputs a HIGH signal from the output port 51*a* through the photocoupler 4 to the PWM control IC 23, thereby stopping the operation of the PWM control IC 23. It is noted that the current value I3 may be adjusted or changed depending on the cell configuration of the battery pack 2.

If the microcomputer 50 has determined that the battery pack 2 is not the second type in Step 224, the microcomputer 50 determines in Step 226 whether or not the charging current is equal to or smaller than I4 (I4<I2). For example, it is assumed that 1.5 A is employed as the current value I4. It is noted that the current value I4 may be adjusted or changed depending on the cell configuration of the battery pack 2. In this embodiment, the charging device 1 charges the battery pack 2 at constant current and constant voltage charging control. When the charging voltage reaches a predetermined value, the microcomputer 50 starts decreasing the charging current. After that, when the charging current reaches another predetermined value which is smaller than the predetermined value, the microcomputer 50 determines that the battery pack 2 has been fully charged. If the microcomputer 50 has determined that the charging current is equal to or smaller than I4 in Step 226, the microcomputer 50 determines that the battery pack 2 has been fully charged in Step 227. In order to stop charging, the microcomputer 50 outputs a HIGH signal from the output port 51a through the photocoupler 4 to the PWM control IC 23, thereby stopping the operation of the PWM control IC 23.

After the charging the battery pack 2 is over, the display unit 130 lights up with green color to display the stop state in Step 228. In order to light the display unit 130 with green color, the microcomputer 50 outputs a HIGH signal from the output port 51a through the resistor 133 to the display unit 130. In Step 229, the microcomputer 50 determines whether the battery pack 2 is removed from the charging device 1. If the battery pack 2 is removed from the charging device 1, the process returns to Step 201.

Figure 4:
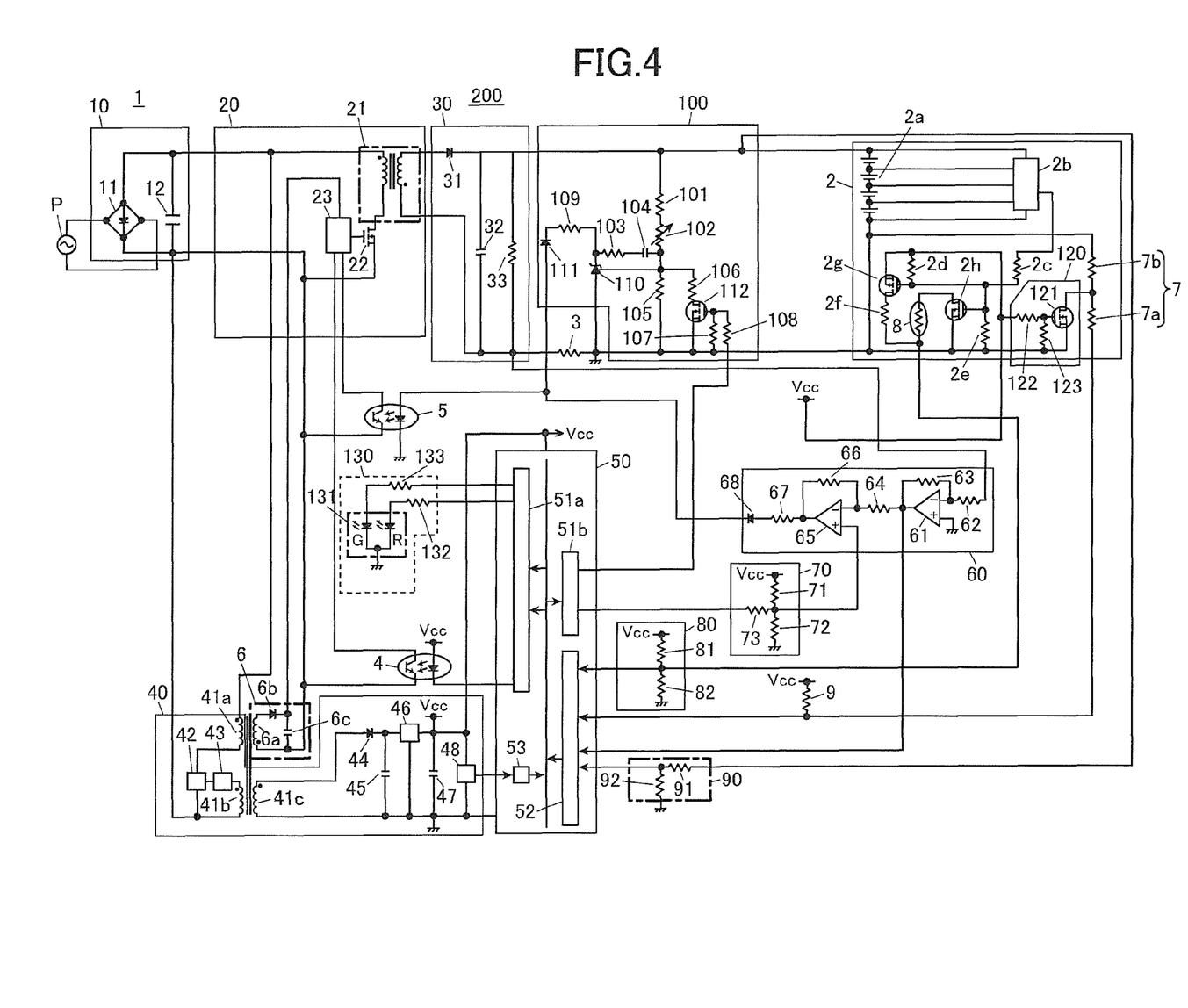
FIG. 4 is a circuit diagram of a charging device for charging a battery pack according to the present invention.

FIG. 4 shows another charging system having a conventional charging device 1 without the switching unit 140, in which the charging device 1 charges the battery pack 2 according to the present invention.

Since the switching unit 140 shown in FIG. 1 is not provided in the charging device 1, the voltage Vcc is constantly applied to the gate terminal of the FET 121 to maintain the FET 121 on. Therefore, the voltage obtained by dividing the voltage Vcc based on the ratio between the resistance values of the determination resistor 9 and the battery identifying resistor 7a is inputted to the A/D port 52 of the microcomputer 50. For example, provided that the first battery identifying resistor 7a corresponding to four cells connected in series has a resistance of a, another first battery identifying resistor 7a corresponding to five cells connected in series has a resistance of b, and the determination resistor 9 has a resistance of w, either one of the following voltages is inputted to the A/D port 52 of the microcomputer 50. If the battery pack 2 has four battery cells 2a connected in series, the voltage of Vcc×a/(a+w) is inputted to the A/D port 52. If the battery pack 2 has five battery cells 2a connected in series, the voltage of Vcc×b/(b+w) is inputted to the A/D port 52. The microcomputer 50 determines based on the potential difference at the A/D port 52 whether or not the battery pack 2 attached in the charging device 1 has four battery cells 2a connected in series. In this case, the microcomputer 50 merely determines the number of the battery cells 2a connected in series in the battery pack 2. And, the microcomputer 50 cannot determine whether the battery pack 2 is the first type or the second type. However, the charging device 1 is able to charge the battery pack 2 according to the present invention, depending on the number of battery cells 2a connected in series in the battery pack 2. In this case, if the charging current is set for the first type of the battery pack 2 such as 4S1P or 5S1P type, charging the battery cells 2a by using the set charging current does not cause any trouble to shorten the life of the battery pack 2 regardless of the type of the battery pack 2.

As described above, the battery type identifier 7 of the battery pack 2 has two different battery identifying resistors 7a and 7b: the first battery identifying resistor 7a identifying the number of battery cells 2a connected in series, and the second battery identifying resistor 7b identifying the configuration of the battery cells 2a in the battery pack 2. The charging device 1 determines the cell configuration and the number of battery cells 2a by two stages. Accordingly, the cell configuration and the number of battery cells 2a in the battery pack 2 can be determined precisely, compared with the battery pack 2 having a single battery identifying resistor. In other words, an accuracy to determine the configuration of the battery pack 2 can be improved.

On the other hand, the charging device 1 has the switching unit 140 to control an application of the reference voltage to the battery pack 2 and assist in determining the configuration of the battery pack 2 and the number of series-connected battery cells 2a in the battery pack 2. Accordingly, the charging device 1 can determine the type of battery pack 2 and the configuration thereof precisely, compared with a conventional charging device. More precisely, the battery pack has two different battery pack identifying resistors; one being used to determine the number of battery cells connected in series, the other being used to determine the arrangement of the battery cells, 1P or 2P. On the other hand, the charging device determines the configuration of battery cell in the batter pack at two stages, so that the configuration of battery cell in the batter pack can be determined more precisely, thereby avoiding the shortening the lifetime of the battery pack and any damage to the battery pack.

It should be noted the number of battery cells 2a connected in series is not limited to four or five as described above. Any number of series-connected battery cells 2a is fall into the scope of the present invention.

What is claimed is:

1. A charging system comprising a battery pack and a charging device, wherein
the battery pack comprises:
a battery cell; and
a plurality of identifiers that identify a configuration of the battery cell, and
the charging device comprises:
a charging unit that charges the battery pack;
a signal transmission unit that transmits a first signal and a second signal to the battery pack separately to read the plurality of identifiers when the battery pack is attached to the charging unit;
a reading unit that reads the plurality of identifiers according to the first and second signals to determine the configuration of the battery cell; and
a control unit that controls the charging unit according to the configuration of the battery cell;
wherein the plurality of identifiers include a first battery identifying resistor and a second battery identifying resistor connected to the first battery identifying resistor in series, the first and second battery identifying resistors having a first resistance and a second resistance, respectively;
wherein the battery pack further comprises a switching portion connected to the second battery identifying resistor in parallel to short-circuit the second battery identifying resistor by the signal transmission unit;
wherein the switching portion short-circuits the second battery identifying resistor on receiving the first signal, and the reading unit reads only the first resistance to determine a number of battery cell connected in series; and
wherein the switching portion operationally connects the second battery identifying resistor to the first battery identifying resistor in series on receiving the second signal, the reading unit reads combined resistances of the first and second battery identifying resistances to determine a connection manner of the battery cells in the battery pack.

2. The charging system as claimed in claim 1, wherein
the battery pack is either one of a first type or a second type, the first type of battery pack including a single battery cell and a first plurality of battery cells connected in series, the second type of battery pack including a single battery unit and a second plurality of battery units connected in series, each of the second plurality of battery units including at least two battery cells connected in parallel;

the control unit controls the charging unit according to the number of battery cell connected in series and the connection manner of the battery cells.

3. The charging system as claimed in claim 1, wherein
the charging unit feeds a charging current flowing through the battery pack, and the control unit determines the charging current, according to the configuration of the battery cell.

4. The charging system as claimed in claim 1, wherein control unit performs a constant voltage and constant current control for charging the battery pack, the control unit adjusts a threshold current value to stop charging the battery pack according to the configuration of the battery cell.

* * * * *